(12) United States Patent
Flamme

(10) Patent No.: US 9,872,566 B2
(45) Date of Patent: Jan. 23, 2018

(54) ELECTROMOTIVE FURNITURE DRIVE

(71) Applicant: DewertOkin GmbH, Kirchlengern (DE)

(72) Inventor: Klaus-Peter Flamme, Utting (DE)

(73) Assignee: DEWERTOKIN GMBH, Kirchlengern (DE)

( * ) Notice: Subject to any disclaimer, the term of this patent is extended or adjusted under 35 U.S.C. 154(b) by 0 days.

(21) Appl. No.: 15/208,218

(22) Filed: Jul. 12, 2016

(65) Prior Publication Data

US 2016/0345736 A1  Dec. 1, 2016

Related U.S. Application Data

(62) Division of application No. 14/411,456, filed as application No. PCT/EP2013/063693 on Jun. 28, 2013, now Pat. No. 9,408,466.

(30) Foreign Application Priority Data

Jun. 28, 2012  (DE) .................. 10 2012 105 717

(51) Int. Cl.
  *A47C 1/034*  (2006.01)
  *A47C 1/035*  (2006.01)
  (Continued)

(52) U.S. Cl.
  CPC .......... *A47C 1/0242* (2013.01); *A47C 1/0246* (2013.01); *A47C 1/034* (2013.01);
  (Continued)

(58) Field of Classification Search
  CPC ... A47C 1/0242; A47C 1/03211; A47C 1/034; A47C 7/506
  (Continued)

(56) References Cited

U.S. PATENT DOCUMENTS 5,265,935 A  11/1993  Geisler
5,466,046 A  11/1995  Komorowski
(Continued)

FOREIGN PATENT DOCUMENTS

| DE | 102005033629 | 2/2006 |
|---|---|---|
| EP | 1 161 907 | 12/2001 |
| WO | WO 2004/032684 | 4/2004 |

OTHER PUBLICATIONS

International Search Report issued by the European Patent Office in International Application PCT/EP2013/063693 dated Jun. 28, 2013.

*Primary Examiner* — Rodney B White
(74) *Attorney, Agent, or Firm* — Henry M. Feiereisen LLC

(57) ABSTRACT

An electromotive furniture drive includes a drive unit and a power take-off unit which can be moved relative to the drive unit. At least one connecting element is arranged on each of the drive unit and the power take-off unit to respectively connect the drive unit and the power take-off unit to a furniture fitting. Each of the connecting elements provides at least two force application points in spaced apart relation for the connection to the furniture fitting in a direction transverse to the relative movement between the drive unit and the power take-off unit. The force application points are spaced apart from one another at least by a distance which is greater than approximately 50% of a displacement movement of the furniture drive.

53 Claims, 9 Drawing Sheets

(51) Int. Cl.
  *A47C 1/0355* (2013.01)
  *A47C 1/024* (2006.01)
  *A47C 7/50* (2006.01)
  *A47C 1/032* (2006.01)
  *A47C 7/56* (2006.01)
  *F16H 25/20* (2006.01)

(52) U.S. Cl.
  CPC .......... *A47C 1/03211* (2013.01); *A47C 7/506* (2013.01); *A47C 7/56* (2013.01); *F16H 2025/2037* (2013.01); *Y10T 74/20* (2015.01)

(58) Field of Classification Search
  USPC ....................................................... 297/85 M
  See application file for complete search history.

(56) References Cited

U.S. PATENT DOCUMENTS

| | | | |
|---|---|---|---|
| 5,482,350 A | 1/1996 | Komorowski | |
| 5,651,580 A | 7/1997 | La Pointe | |
| 5,730,494 A | 3/1998 | La Pointe | |
| 5,992,931 A | 11/1999 | La Pointe | |
| 8,016,348 B2 | 9/2011 | Hoffmann | |
| 8,123,288 B2 | 2/2012 | Murphy | |
| 8,366,188 B2 | 2/2013 | Adams | |
| 8,398,169 B2 | 3/2013 | LaPointe | |
| 8,506,009 B2 | 8/2013 | LaPointe | |
| 8,517,463 B2 | 8/2013 | Murphy | |
| 8,696,053 B2 | 4/2014 | LaPointe | |
| 8,915,544 B2 | 12/2014 | Lapointe | |
| 9,408,466 B2 * | 8/2016 | Flamme | A47C 1/0242 |
| 2001/0035668 A1 | 11/2001 | Gaffney | |
| 2004/0012231 A1 | 1/2004 | Hesse | |
| 2006/0061148 A1 | 3/2006 | Pollard | |
| 2010/0127538 A1 | 5/2010 | Hoffmann | |
| 2010/0127555 A1 | 5/2010 | Hoffmann | |
| 2011/0018331 A1 | 1/2011 | Murphy et al. | |
| 2011/0049963 A1 | 3/2011 | Shih | |
| 2011/0175426 A1 | 7/2011 | Lawson | |
| 2011/0198894 A1 | 8/2011 | Hsieh et al. | |
| 2011/0248546 A1 | 10/2011 | La Pointe | |
| 2011/0248547 A1 | 10/2011 | La Pointe | |
| 2011/0291460 A1 | 12/2011 | Murphy | |
| 2012/0049606 A1 | 3/2012 | Lawson | |
| 2012/0286557 A1 | 11/2012 | Hoffman | |
| 2013/0175847 A1 | 7/2013 | Lawson | |

* cited by examiner

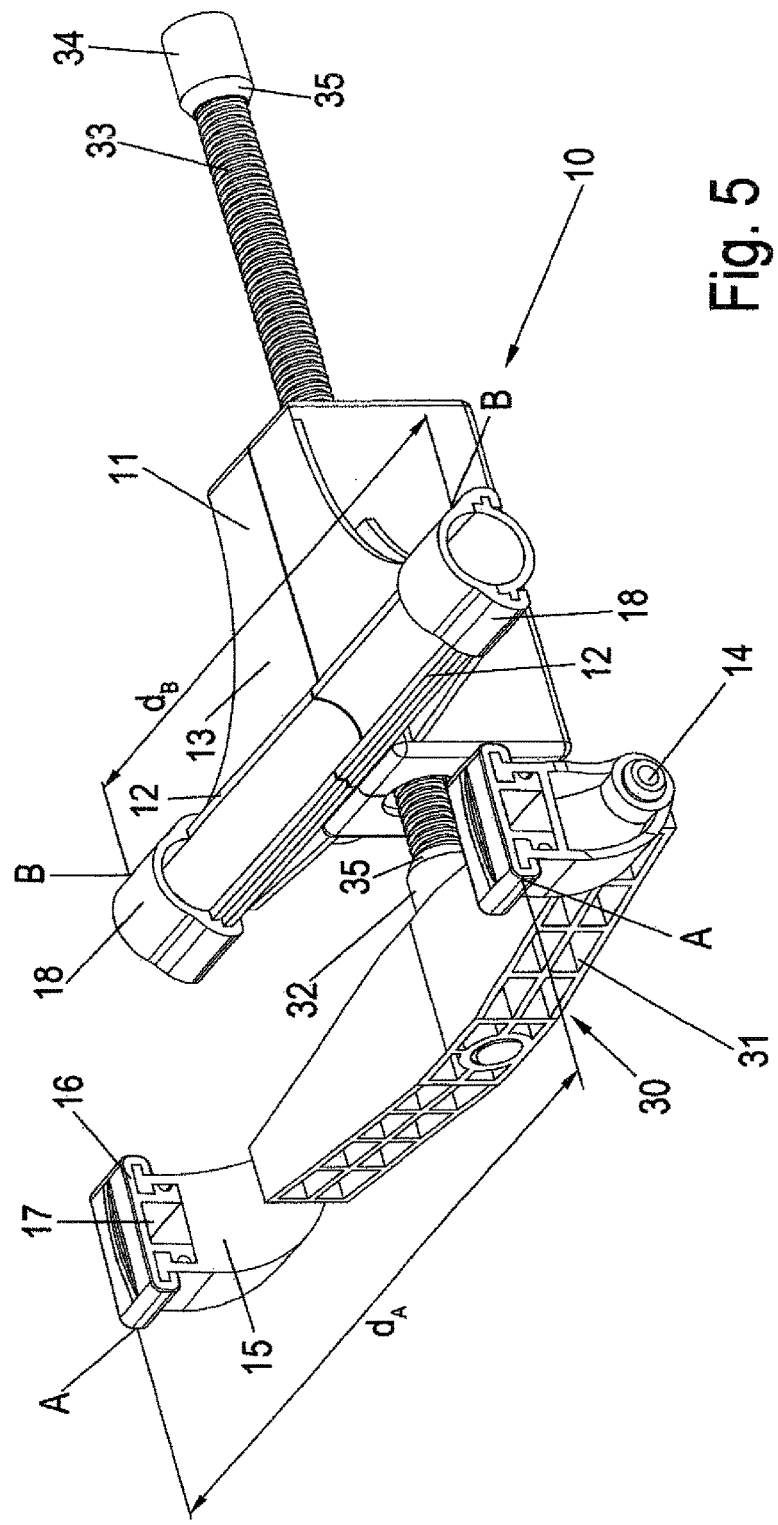

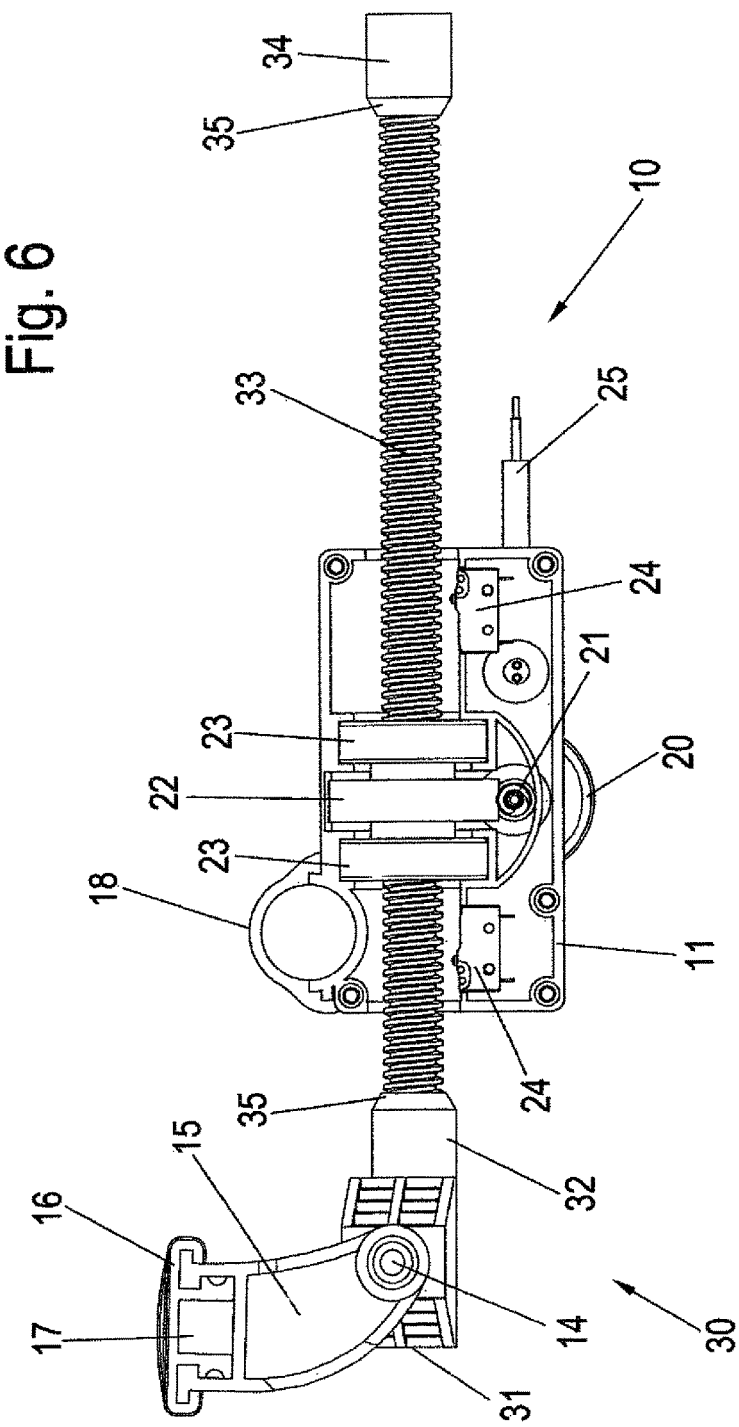

ELECTROMOTIVE FURNITURE DRIVE

CROSS-REFERENCES TO RELATED APPLICATIONS

This application is a divisional application of prior filed U.S. patent application, application Ser. No. 14/411,456, now U.S. Pat. No. 9,408,466 B2, filed Dec. 26, 2014, the priority of which is hereby claimed under 35 U.S.C. §120 and which is the U.S. National Stage of International Application No. PCT/EP2013/063693, filed Jun. 28, 2013, which designated the United States and has been published as International Publication No. WO 2014/001533, and which claims the priority of German patent application, Serial No. 10 2012 105 717.6, filed Jun. 28, 2012.

The contents of U.S. application Ser. No. 14/411,456, International Application No. PCT/EP2013/063693 and German Application No. 10 2012 105 717.6 are incorporated herein by reference in their entireties as if fully set forth herein.

BACKGROUND OF THE INVENTION

The invention relates to an electromotive furniture drive, comprising a drive unit and a power take-off unit which can be moved relative to the drive unit. The invention further relates to a piece of furniture, in particular seating furniture, comprising such an electromotive furniture drive.

Electromotive furniture drives, which are referred to below in short as drives, are installed in reclining and seating furniture in order to enable the convenient adjustment of furniture parts such as seats, backrests, footrests etc relative to a base body of the piece of furniture and relative to each other. Adjustable seating furniture, in particular so-called television armchairs or relaxation chairs, usually comprise a furniture fitting which is mechanically relatively complex and which allows a complex sequence of movements of the different cushion units mounted thereon in cooperation with a plurality of levers and rod assemblies.

Such a seating furniture fitting, as is described for example in the specification US 201110198894 A1, frequently comprises a cross member arranged beneath the seating surface, which cross member performs a combined displacing and rotating movement when the backrest is pivoted to the rear from an upright seating position and a foot rest is folded upwardly in front of the seating surface. The motorised adjustment of this seating furniture occurs by a drive which is fixed in the seating direction longitudinally to a base frame of the furniture fitting. The drive performs a linear displacing movement on a drive output element (power take-off element), which movement is transferred via swivel levers as a combined displacing/rotating movement to the cross member as described above, which is referred to below as a rotating cross member. It is disadvantageous in this respect that the drive has a relatively large configuration which is especially long and which extends over the entire length of the base frame of the furniture fitting. Moreover, a long distance travelled by the power take-off element is necessary in relation to the base element of the drive connected to the base frame. Both aspects lead to a furniture drive which requires a large amount of material input and is therefore expensive. Moreover, the furniture fitting must be modified for the installation of the furniture drive. In comparison with a non-motorised version of the furniture fitting which can be obtained on the market, the rotating cross member for the motorisable furniture fitting is provided with a reinforced configuration, and mounting possibilities for the base element of the furniture drive must be provided in the base frame. This leads to additional costs for the furniture fitting, not least due to the necessity to produce two different models which need to be kept on stock.

SUMMARY OF THE INVENTION

It is therefore an object of the present invention to provide an electromotive furniture drive of the kind mentioned above which can be used in a seating furniture, especially a television armchair or relaxation chair, and which can be produced with a low amount of material input and thus at low cost. It is a further object to arrange the electromotive furniture drive in such a way that a modification of the furniture fitting for accommodating the electromotive furniture drive is not necessary, but that the electromotive furniture drive can rather also be used with the furniture fitting designed for manual actuation.

According to one aspect of the invention, the object is achieved by an electromotive furniture drive which includes a drive unit and a power take-off unit which can be moved relative to the drive unit, wherein at least one connection element is arranged on the drive unit and on the power take-off unit in each case, via which the drive unit and the power take-off unit can respectively be connected to a furniture fitting. The electromotive furniture drive is characterized in that the connection elements provide at least two respective, mutually spaced force application points for the connection with the furniture fitting in a direction transverse to the relative movement between the drive unit and the power take-off unit, wherein the force application points are respectively apart from one another at least by a distance which is greater than approximately 50% of a distance travelled by the furniture drive.

As a result of the connection elements with the spaced force application points, the force for the movement of the piece of furniture is not applied centrally by the electromotive furniture drive to the components of the furniture fitting, but it is distributed more broadly onto said components. The furniture fitting therefore need not be modified for use with the furniture drive, and in particular it is not necessary to reinforce the components of the furniture fitting on which the furniture drive acts. The travel of the furniture drive shall be understood within the scope of the application as the length of the maximum possible displacement movement of the furniture drive.

The connection elements can establish contact with the components of the furniture fitting either in a punctiform manner or also over a larger area in a linear manner or over a wide area. A connection element can provide several force application points in this respect on its part. It is relevant within the scope of the application that at least two of the force application points have the indicated distance which is relatively large with respect to the travel, which ensures that the total force is not concentrated centrally in a point but is introduced in a distributed manner into the component.

In a preferred embodiment of the electromotive furniture drive, it is especially suitable for a furniture fitting arranged as a fitting for seating furniture, wherein the distance of the force application points is respectively greater than 25% and in particular greater than 50% of a width of the furniture fitting.

In a further preferred embodiment of the electromotive furniture drive, the distance of the force application points is greater than 10 cm and in particular greater than 20 cm.

In a further preferred embodiment of the electromotive furniture drive, the connection between the drive unit or the drive unit and the furniture fitting is arranged in a frictionally engaged or interlocking manner, preferably in a releasable manner, and more preferably the connection is screwless. In contrast to a materially bonded connection, the furniture drive can simply be retrofitted in such a connection.

In a further preferred embodiment of the electromotive furniture drive, the connection elements are arranged for the connection with a cross member and/or rotating cross member extending transversely in the furniture fitting between lateral lever mechanisms. During a movement of the furniture fitting, such cross members and/or rotating cross members have a displacement movement with shorter travel relative to each other than one of the cross members in relation to a base frame of the furniture fitting. A furniture drive which only acts on cross members or rotating cross members can thus be arranged with shorter travel and thus in an in particular compact manner. The connection of the furniture drive with the cross member and/or the rotating cross member is preferably releasable and even more preferably screwless, e.g. as a latching, sliding or a snap-on connection, by means of which the furniture drive can be retrofitted easily. The invention thus provides in this embodiment that the respective cross member or the respective rotating cross member is supported in contact points, of which at least two have the indicated distance which is large relative to the travel. This can be achieved by a respectively long connection element, but also by two or more shorter connection elements, of which the outer ones thereof have the aforementioned greater distance. The cross members or the rotating cross members can thus be used to introduce the force, even if they are unsuitable as a result of their dimensioning, e.g. their diameter, to introduce a force on the centrally without bending or twisting excessively.

In a further preferred embodiment of the electromotive furniture drive, two mutually spaced swivel levers are provided as connection elements. The swivel levers can be arranged via swivel joints on extension arms of the drive unit and can be connected in a torsion-proof manner by means of braces to a rotating cross member of the furniture fitting. The extension arms are used to provide the desired distance of the swivel levers. The swivel joints allow a combined translatory and rotary movement of the swivel joint when the furniture drive is actuated.

In a further preferred embodiment, the electromotive furniture drive comprises a motor which acts via a worm on a rotatably mounted spindle nut, which thereupon cooperates with a torsion-proof spindle. The spindle nut is preferably arranged together with at least one bearing in a housing of the power take-off unit, by means of which a compact configuration can be realised.

The furniture drive can principally comprise a housing which encloses the spindle completely, or it may also comprise an exposed spindle. In a further preferred embodiment, only one cover is provided which covers the spindle at least on two sides, preferably from above and below. Such a cover instead of an enclosing housing is cost-effective, saves material and simplifies assembly. A certain amount of protection is still provided, e.g. against threads which hang loose from a seat cover and which can get caught in the spindle. In a further embodiment, the cover surrounds the spindle at least from three sides, e.g. from above or below and at an end in a U-shaped manner, wherein the cover is integrally arranged with integrated foil hinges.

A piece of furniture in accordance with the invention comprises at least one furniture part fixed to a furniture fitting and is provided with an electromotive furniture drive as described above. The piece of furniture is preferably arranged as a seating furniture and in particular as a relaxation chair.

According to another aspect of the invention, the object is achieved by a piece of furniture which includes at least one furniture part fixed to a furniture fitting and is provided with an electromotive furniture drive as described above. The piece of furniture is preferably arranged as a seating furniture and in particular as a relaxation chair.

BRIEF DESCRIPTION OF THE DRAWING

The invention will be explained below in closer detail by reference to eight drawings, wherein:

FIG. 5 shows a perspective view of a furniture drive in a second embodiment;

FIG. 6 shows a top view of the furniture drive of the second embodiment with a partly opened drive unit;

DETAILED DESCRIPTION OF PREFERRED EMBODIMENTS

Figure 1:
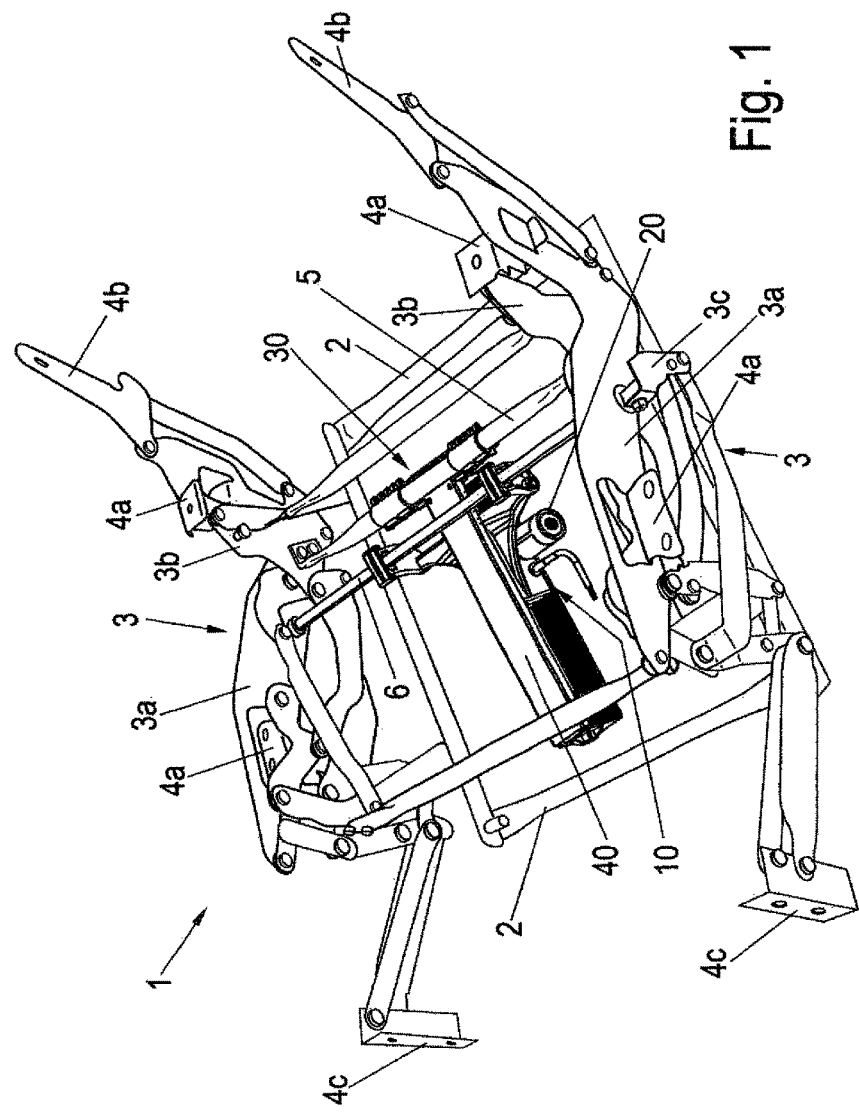
FIG. 1 shows a perspective schematic overview of a furniture fitting for a seating furniture with an installed furniture drive.

FIG. 1 shows a schematic perspective view of a section of a furniture fitting 1 of a relaxation chair.

The furniture fitting 1 comprises a rectangular base frame 2, which is aligned substantially parallel to the ground when using the furniture fitting 1 in the end product and is static relative to the ground during adjustment of the chair. A respective lever mechanism 3 with a plurality of levers and rod assemblies is arranged on the sides of the base frame 2, of which levers 3a, 3b, 3c and 3d are provided with reference numerals by way of example. Connection elements 4a, 4b, 4c are connected to the levers of the two lever mechanisms 3, e.g. by tabs or angles which support the various cushion elements of the chair, e.g. a seating surface, a backrest and a footrest. The connection elements 4a are used for fixing the seating surface, the connection elements 4b carry the backrest and the connection elements 4c the footrest. The lever mechanisms 3 enable a complex sequence of movements of these cushion elements with respect to each other.

Several cross members extend between the lever mechanisms 3 on the one and on the other side of the base frame 2, of which one cross member 5 and one rotating cross member 6 are relevant within the scope of the application and are emphasised by respective reference numerals. Said cross member 5 and the rotating cross member 6, as also further provided cross members, are used for stabilisation of the furniture fitting and the smooth movement of the levers of both lever mechanisms 3 on both sides of the furniture fitting 1.

The rotating cross member 6 performs both a displacing and also a rotating movement in relation to the base frame during a movement sequence of the chair from an upright sitting position via a position with lifted footrest to a reclined position with lowered backrest.

In a first movement phase, the rotating cross member 6 is pivoted without any significant displacement, as a result of which the footrest travels out. The rotating movement of the rotating cross member 6 is transmitted by the lever 3c (see FIG. 1) via a further levers and rod assemblies to the connection elements 4c and thus to the footrest. The rotating movement of the rotating cross member 6 is then stopped by a limit stop, whereupon substantially only a displacement movement of the rotating cross member 6 occurs in a second movement phase. It leads to a movement of the levers 3a and 3b relative to each other, and thus to a slight lowering of the rear part of the seating surface on the one hand and to a pivoting of the backrest on the other hand.

The cross member 5 also performs a displacement movement in the aforementioned movement sequence, but with a negligible rotating movement. Both the cross member 5 and also the rotating cross member 6 move in substantially the same direction with respect to the base frame 2 during the performance of the aforementioned movement sequence, but this occurs with different advancing speeds. This leads to the consequence that the rotating cross member 6 not only performs a relative movement in relation to the base frame 2 but also in relation to the cross member 5.

This is utilised by the invention in that it uses a furniture drive for the motorised displacement of the furniture fitting 1, which acts on the cross member 5 on the one hand and on the rotating cross member 6 on the other hand without the furniture drive being fixed in a stationary manner with one of its components to or on the base frame 2. In the illustrated embodiment, the furniture drive comprises a drive unit 10 which is connected to the rotating cross member 6 and a power take-off unit 30 (drive output unit) which is connected to the cross member 5. A shorter travel is thus advantageously produced by the application of the furniture drive only to the cross member 5 and the rotating cross member 6, thus providing a more compact configuration of the furniture drive compared with a drive extending over the entire length of the base frame 2.

Figure 2:
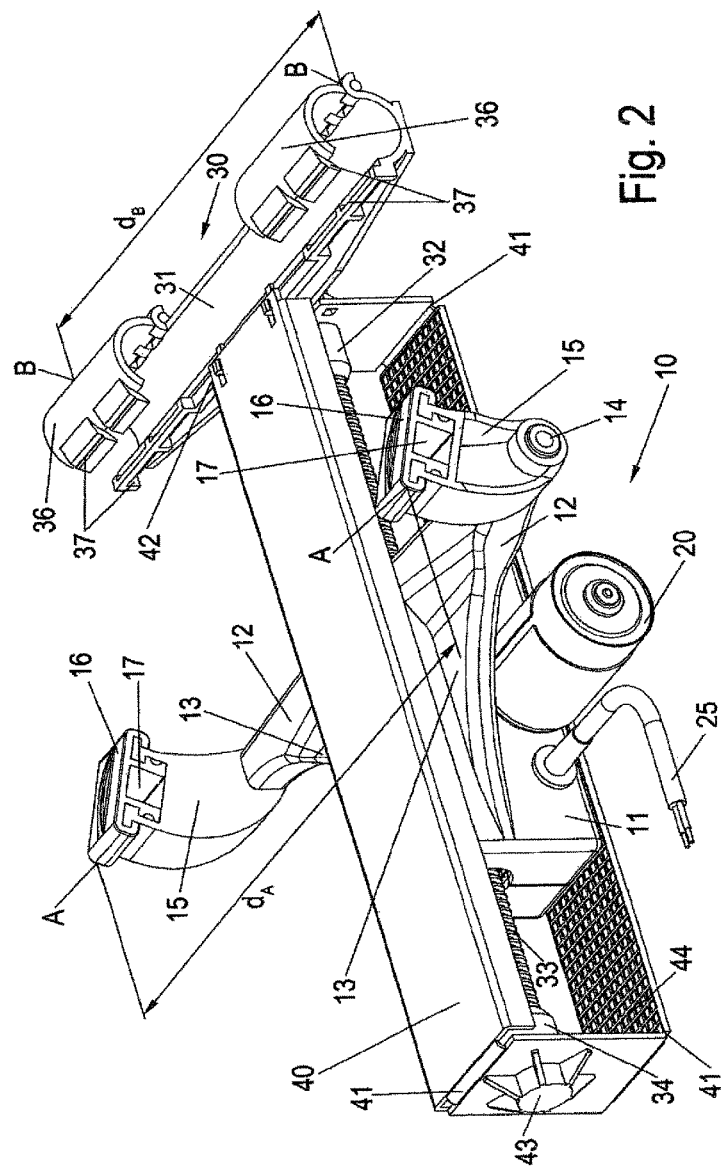
FIG. 2 shows a perspective view of a furniture drive in a first embodiment.
Figure 3:
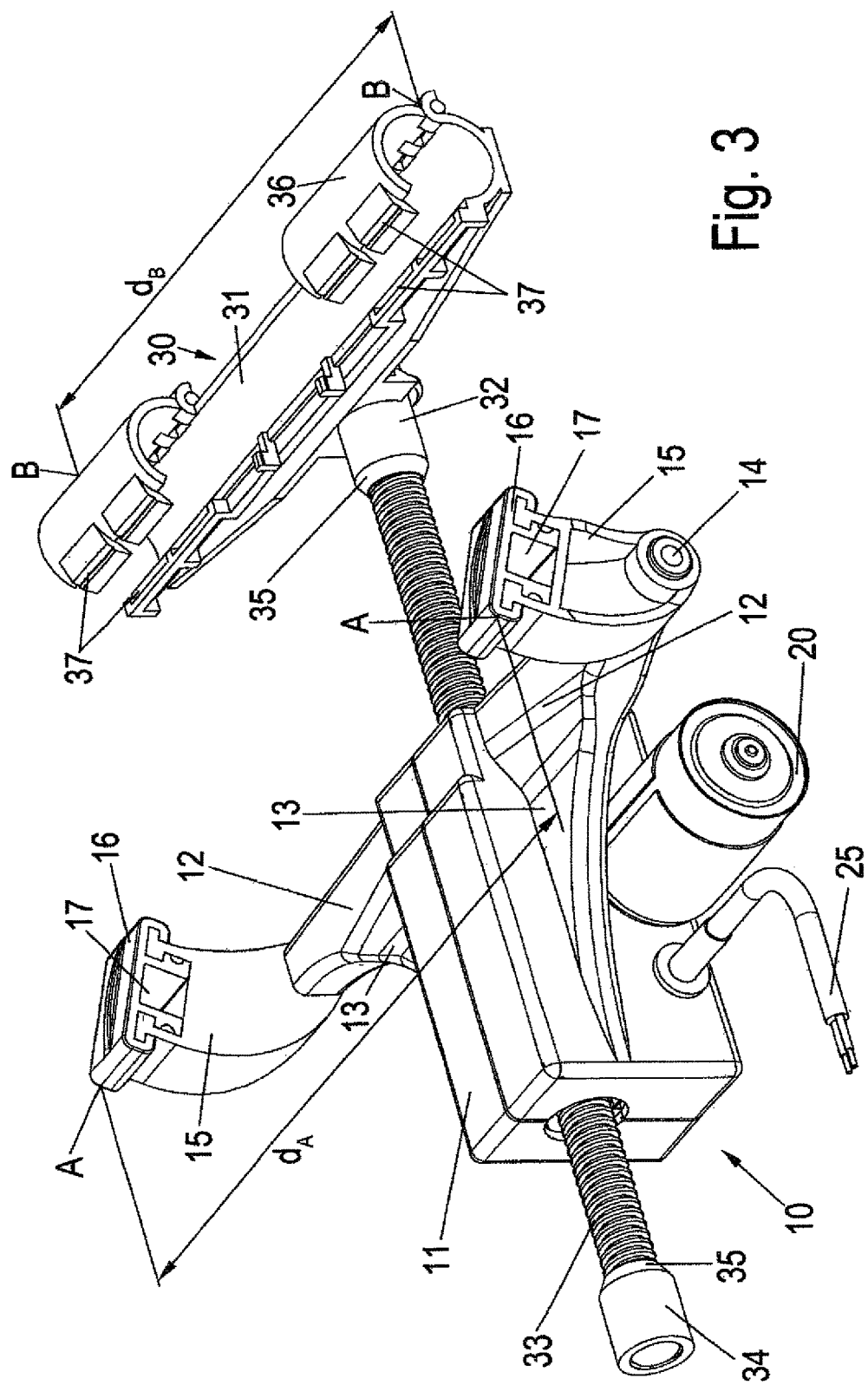
FIG. 3 shows a further perspective view of the furniture drive of the first embodiment without cover.
Figure 4:
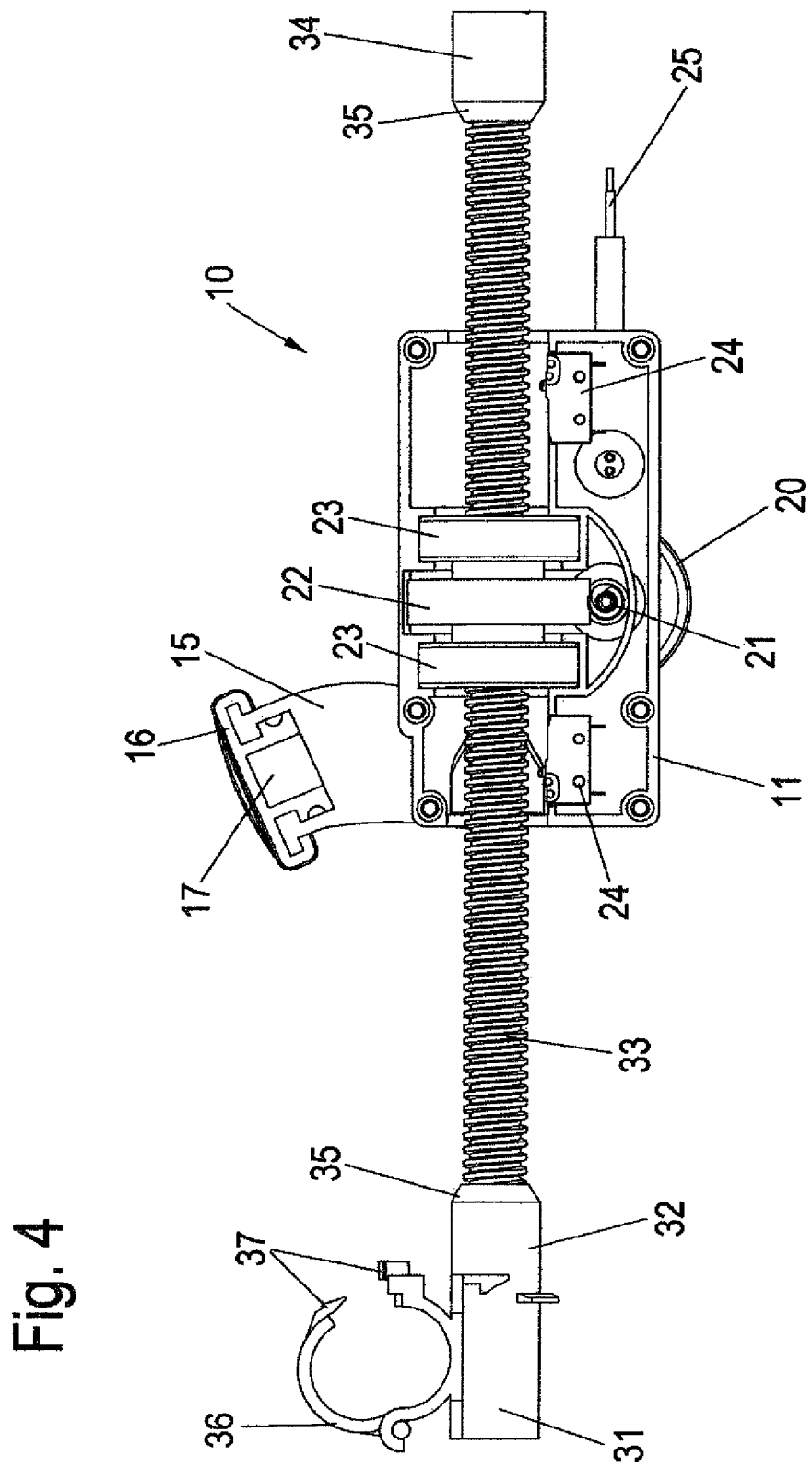
FIG. 4 shows a top view of the furniture drive of the first embodiment with a partly opened drive unit.

FIGS. 2 and 3 show the furniture drive of FIG. 1 in perspective schematic views in a more detailed manner. An optional cover has been removed in FIG. 3 as compared to FIG. 2. FIG. 4 shows the furniture drive (also without the covers) in a side view. FIG. 4 shows the drive unit 10 in a partly opened manner in order to provide insight into its inner configuration.

As already described above, the furniture drive comprises the drive unit 10 and the power take-off unit 30 which are displaceable against each other along a direction of displacement.

The drive unit 10 comprises a housing 11, on which opposite extension arms 12 are arranged which protrude laterally, wherein cross-struts 13 are provided for reinforcing the extension arms 12. The housing 11 is formed in this case by two half-shells. Each of the half-shells is preferably integrally arranged with the respective extension arm 12 and the cross-strut 13, e.g. as a plastic injection-moulded part. A flange for mounting the motor 20 and a lead-through for a cable 21 are arranged on one of the half-shells. Apart from this, the two half-shells can be mirror-symmetrical when seen from the outside.

One respective swivel lever 15 is pivotably connected to each of the extension arms 12 at the respective outer end via a swivel joint 14. The swivel levers 15 are profiled at their respective free ends in such a way that a brace 16 can be inserted, which forms a square receptacle for the rotating cross member 5 of the furniture fitting 1 together with the swivel lever. The swivel lever 15 and the brace 16 thus represent in combination a connection element for connecting the furniture drive to the furniture fitting 1. The connection is interlocking and it is also torsion-proof as a result the square configuration of the rotating cross member 6 and the receptacle which is also square, and it is suitable to transmit torques. In the illustrated embodiments, the rotating cross member 6 is shown in form of a continuous profile shaft arranged as a square shaft. Any kind of profiling of the rotating cross member 6 can principally be used, wherein the connection element is adjusted to this profiling.

In the direction of the rotating cross member 6, i.e. perpendicularly to the direction of displacement of the power take-off unit 30 in relation to the drive unit 10, the swivel levers 15 and the braces 16, as the connection elements to the furniture fitting 1, are spaced from each other by a distance $d_4$. The furniture drive thus acts on the rotating cross member 6 at two force introduction points A which are spaced from each other.

The power take-off unit 30 comprises a cross member 31, in which a spindle receptacle 32 is centrally incorporated. A spindle 33 is inserted into said receptacle in a torsion-proof manner. An end nut 34 is also inserted in a torsion-proof manner at the free end of the spindle 33. The spindle receptacle 32 and the end nut 34 are provided with a switching bevel 35 on the mutually facing sides. A formed part with a switching bevel 35 can alternatively be provided instead of the end nut 34, wherein the formed part is fixedly inserted on the spindle 33.

As is shown in particular in FIG. 4, the spindle 33 extends centrally through the housing 11 of the drive unit 10. A spindle nut 22 is rotatably mounted by means of two bearings 23 in the housing 11. The spindle nut 22 cooperates with the motor 20, e.g. in that the spindle nut 22 is provided with an exterior toothing into which a worm 21 engages which is situated on a rotating shaft of the motor 20.

The spindle nut 22 cooperates with the spindle 33 in such a way that upon actuation of the motor 20 the power take-off unit 30 is displaced relative to the drive unit 10. The furniture drive is thus arranged as a linear drive. The connection with the cross member 5 and the rotating cross member 6 ensures that the drive unit 10 and the power take-off unit 30 will not twist with respect to each other.

End switches 24 are arranged in the housing 11 of the drive unit 10, which switches cooperate with the switching bevels 35 of the spindle receptacle 32 and the end nut 34. It is thus prevented via respective switching of the end switches 34 with the motor 20 that the power take-off unit 30 will travel against a mechanical stop. The motor 20 can be provided with a speed-reducing gear in addition to the illustrated worm 21.

The cross-strut 31 has a cross-section with a semicircular recess in its longitudinal direction, i.e. transversely to the direction of displacement of the power take-off unit 30 to the drive unit 10. The cross member 5 of the furniture fitting 1 is inserted into said recess. Clamps 36 shaped in the form of half-shells are provided at both ends of the cross-strut 31, which clamps can engage around the cross member 5. The cross-strut 31 comprises mutually engaging latching means like the half-shell-shaped clamps 36, so that an engaged cross member 5 is connected in an interlocking fashion to the cross-strut 31 in the direction of displacement in the direction of the force applied by the furniture drive. It can be provided that the clamps are reinforced by folded cable ties. Respective guides for the cable ties can be incorporated for this purpose in the cross-strut 31. The cross-strut 31 provides in combination with the two clamps 36 force introduction points B which are spaced by a distance $d_B$ and in which the power take-off unit 30 exerts a force on the cross member 5. The furniture drive thus also acts on the cross member 5 at two force introduction points which are spaced from each other in a respectively wide fashion.

The power take-off unit 30 moves relative to the drive unit 10 during operation of the electromotive furniture drive. This linear movement of the power take-off unit 30 in relation to the drive unit 10 leads to a combined linear displacement and rotating movement of the rotating cross member 6 in relation to the cross member 5 by the swivel levers 15. Bending of these components of the furniture fitting 1 is prevented or reduced by the force introduction points on the rotating cross member 6 and the cross member 5 which are spaced from each other by the distances $d_A$ and $d_B$.

In contrast to drive units known from the state of the art for such furniture fittings, the transmission of force onto the rotating cross member 6 does not occur substantially centrally, but in an outer region of the rotating cross member 6. As a result, it therefore need not be reinforced separately. The same applies to the cross member 5, which in the case of a central introduction of force might optionally not withstand the pressure or tensile load or the bending load.

As a result of the configuration, the spaced swivel levers 15 and the braces 16 as connection elements stiffen the rotating cross member 6 and the cross-strut 31, and the clamps 36 as the connection elements stiffen the cross members 5, i.e. individual components or individual components sections of the furniture fitting 1, which otherwise would not withstand a motorisation of the furniture fitting 1. As a result, bending stresses and/or torsional stresses of individual components or components sections of the functional fitting are reduced without changing the furniture fitting 1.

The connection elements thus stiffen the cross member 5 in a certain respect concerning bending and the rotating cross member 6 with respect to bending and torsion. In the illustrated embodiments, the connection elements are a part of the furniture drive, or the furniture drive comprises parts of the connection elements. The connection elements can be arranged to be connectable to the furniture drive in an alternative fashion. Such connections are then arranged as fixed or alternatively as articulated connections.

Since the furniture drive 10 is only carried via the cross member 5 and the rotating cross member 6, it is not necessary to provide any fastening possibilities for the furniture drive 10 in the base frame 2. A furniture fitting 1 which is designed for manual actuation can be used as a basis for a motor-operated piece of furniture.

In order to reduce bending to a non-critical level and to thus effectively prevent damage to the cross member 5 and the rotating cross member 6, the distances $d_A$ and $d_B$ should be chosen with such a magnitude that they are at least 25% of the width of the cross member 5 and the rotating cross member 6. Since such distances lie in the region of typical chair widths of 40 to 60 cm, the distances $d_A$ and $d_B$ should be in the range of approximately 10 cm or more. As already described above, a shorter travel of the furniture drive is produced by applying the furniture drive to the cross member 5 and the rotating cross member 6. With respect thereto, the distances $d_A$ and $d_B$ are more than approximately 50% of the travel.

In the embodiment shown in FIGS. 1 to 4, a fixed spindle 33 and a rotatably moved spindle nut 22 are provided. It is obviously also possible to realise a relative movement between the drive unit 10 and the power take-off unit 30 in that the spindle is rotatably moved and the spindle nut is arranged to be fixed. Drives other than via a spindle and a spindle nut are principally also possible for the furniture drive in accordance with the application.

In an alternative embodiment of the furniture drive, a rotating power take-off member can also be provided instead of a linearly travelling power take-off unit.

The furniture drive can principally be arranged without a housing enclosing the spindle 33, which saves costs and material and simplifies assembly. The furniture drive can easily be used in the form as shown in FIGS. 3 and 4 for example. In this case, the overall length and the travel can be varied simply by selecting a respectively long spindle. As is shown in FIG. 2, a cover 40 can be provided alternatively, which cover covers the spindle 33 at least upwardly and downwardly and protects said spindle against threads which are suspended from the seat cover and which could get caught in the spindle. Said cover 40 is an integral plastic part in the illustrated embodiment, whose various sides are connected to each other by foil hinges 41. Latching means 42 are arranged at the ends, which cooperate with respective counter-latching means of the cross-strut 31. A pot-shaped receptacle 43 is incorporated in a head part opposite of the cross-strut 31, which receptacle is folded over the end nut 34 of the spindle 33. The inner side of the side of the cover 40 situated beneath the spindle is provided with embossed portions 44, which may accommodate a lubricant that potentially escapes from the drive unit 10, thus preventing soiling of the ground beneath the chair.

FIGS. 5 and 6 show a second embodiment of a furniture drive. The same reference numerals illustrate the same or similarly acting elements in these drawings as in the preceding drawings. FIG. 5 shows the furniture drive in a perspective schematic view, and FIG. 6 shows a view analogously to FIG. 4 in a top view with a partly opened drive unit in order to provide insight into the inner configuration.

The furniture drive in said second embodiment corresponds to the first embodiment with respect to its principal configuration, wherein reference to the description thereof is made here. It can also be used in the furniture fitting 1 as shown in FIG. 1.

The furniture drive again comprises a drive unit 10 and a power take-off unit 30. In contrast to the first example, the drive unit 10 is set up for fixing to the round cross member 5 and the power take-off unit 30 for fixing to the square rotating cross member 6. For this purpose, swivel arms 15 are fixed via swivel joints 14 to a cross-strut 31 of the power take-off unit 30. The drive unit 10 again comprises a housing 11 with extension arms 12, which are provided in this case with a trough-shaped recess of semicircular cross-section, into which the cross member 5 of the furniture fitting 1 is inserted. Catches 18 shaped in the form of half-shells are provided at the ends of the extension arms 12, which catches are pushed onto the extension arms 12 and are able to engage around the cross members 5. The catches 18 and the extension arms 12 are shaped in the respective fashion in order to ensure an interlocking connection. Reference is hereby made to the details made in connection with the first embodiment concerning the configuration of the drive unit 10 in the interior of the housing 11 and especially with respect to the cooperation of the spindle 33 and the spindle nut 22 and the motor 20.

FIGS. 7a to 7d show different possibilities in order to realise a rotatable connection from one connection element of the furniture drive to the cross member 5, which connection transmits forces transversely to the longitudinal direction of the cross member 5. The same reference numerals characterise in this drawing and in the following ones the same or similarly acting elements as in the preceding drawings.

Figure 7A:
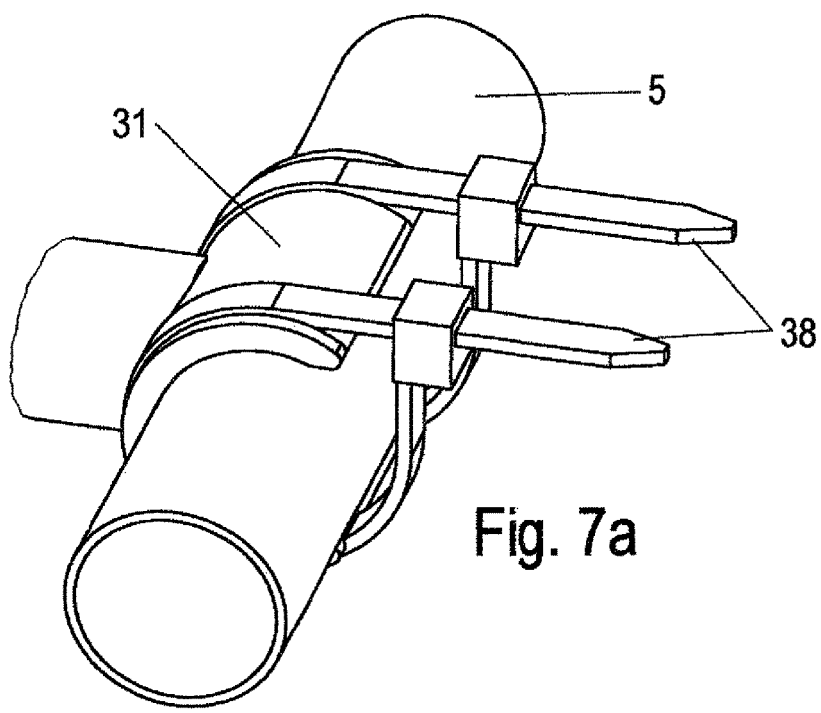
FIGS. 7a-7d show various embodiments of connection elements for a frictionally engaged or interlocking rotatable connection between a furniture drive and a cross member of a furniture fitting.
Figure 7B:
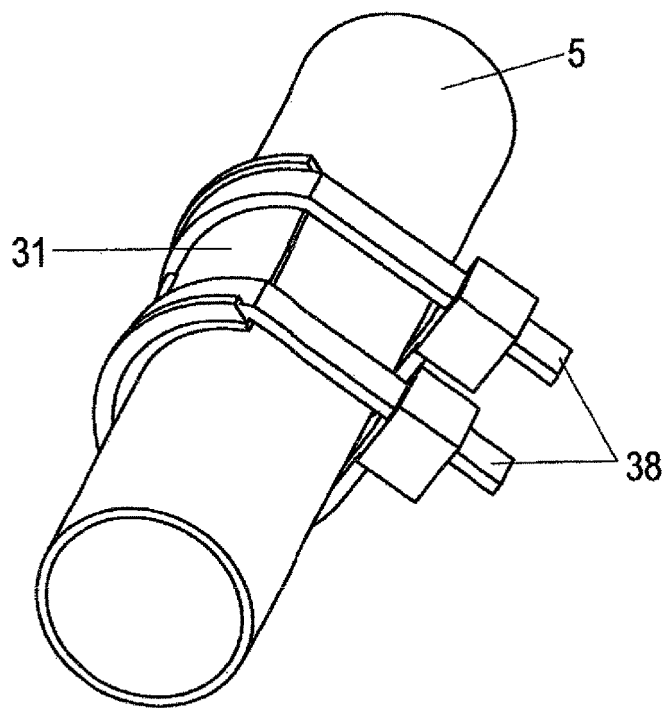
Figure 7C:
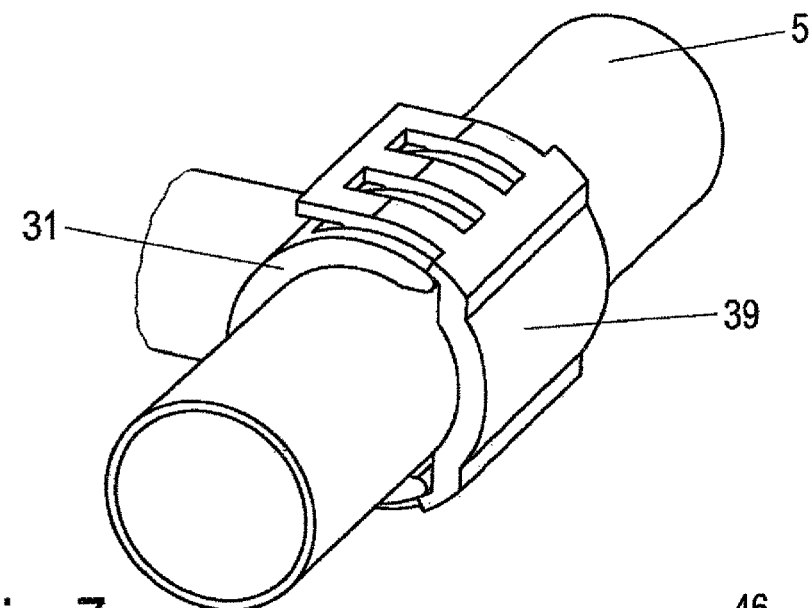

The solutions illustrated in FIGS. 7a to 7c are characterized in that the cross member 5 need not be prepared or modified in any way in order to fix the furniture drive. Accordingly, these solutions are also well suited for retrofitting the electromotive furniture drive.

According to the solutions shown in FIGS. 7a to 7c, the connection element such as the cross-strut 31 is arranged in the manner of a half-shell at its ends, of which only one respective one is shown here, and is fixed by means of cable ties 38 to the cross member 4. The receptacle of the connection element shaped in the form of a half-shell can be made of plastic with slightly greater material thickness as shown in FIG. 7a, or as shown in FIG. 7c with a lower material thickness made of metal.

FIG. 7c shows a similar solution with a receptacle shaped as a half-shell, which is provided in this drawing with invisible detent lugs which snap onto a clip 39 which is placed on the open side of the half-shell-shaped receptacle.

Figure 7D:
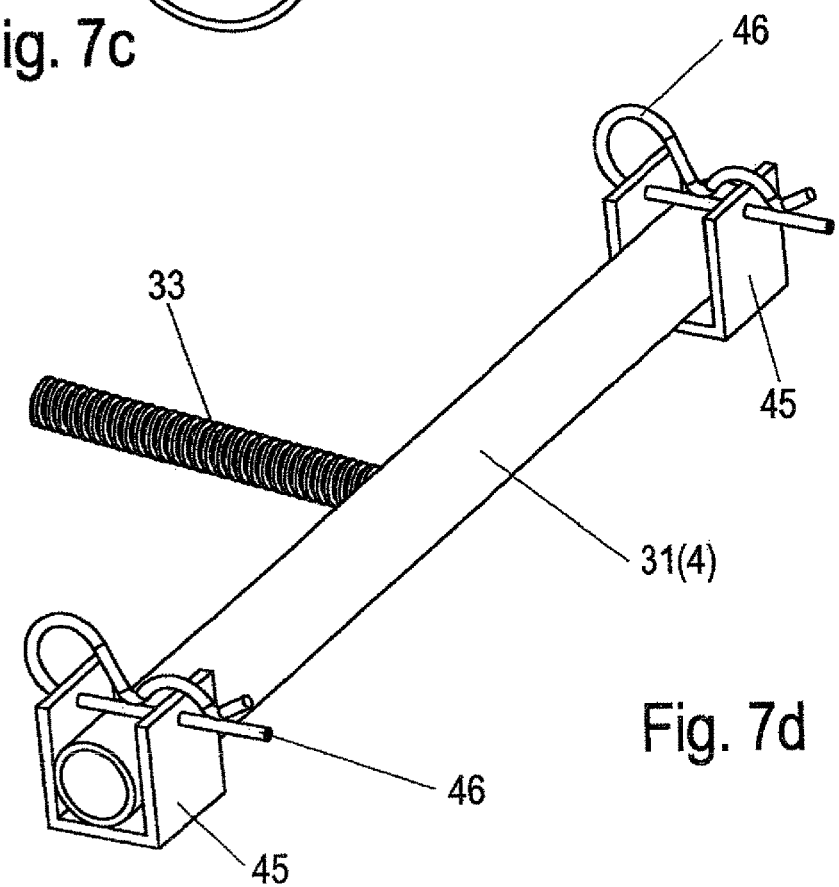

FIG. 7d shows a cross-strut 31 as a connection element of a furniture drive 10, which is arranged similarly to a cross member 5. Such a drive can be used when the furniture fitting 1 comprises a rotating cross member 6, but no suitable or suitably positioned cross member 5. U-shaped clamps 45 are mounted in this case on the lever mechanisms 3 (not shown in FIG. 7d), into which the cross-strut 31 is inserted as a cross member 5 and is secured with securing elements such as the illustrated W-clips 46.

Figure 8:
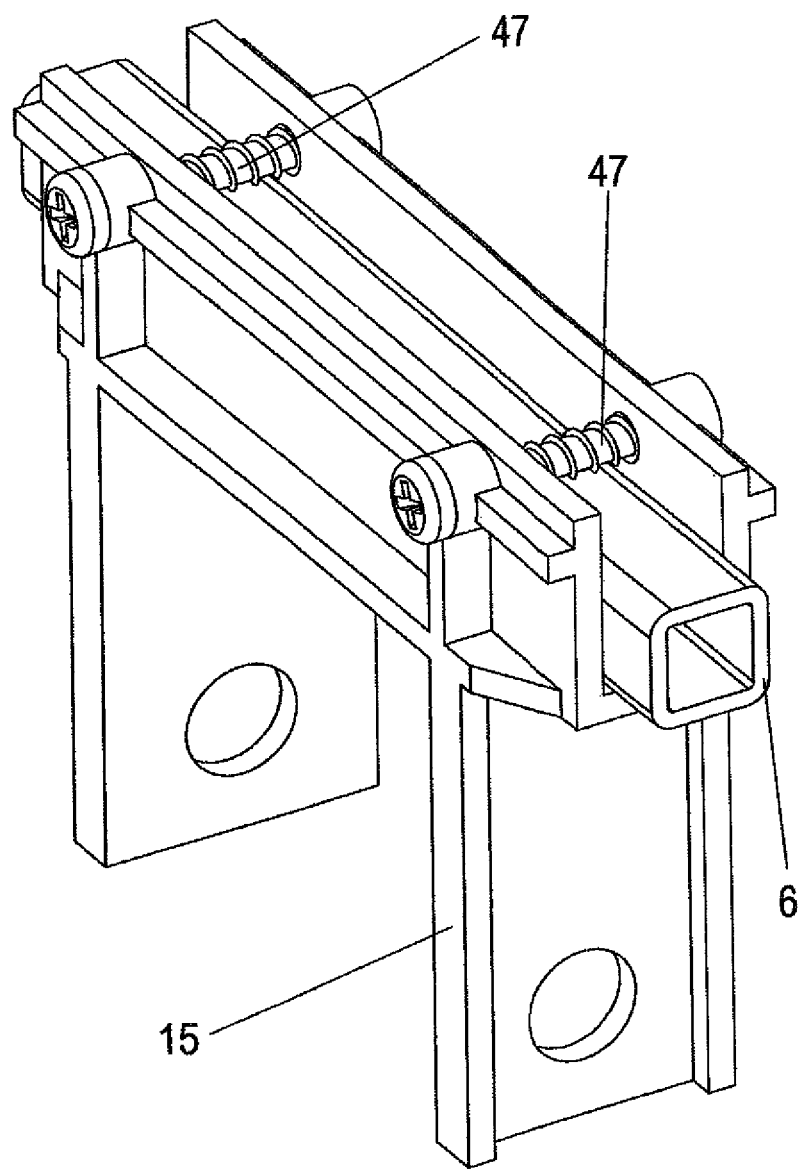
FIG. 8 shows an embodiment of a frictionally engaged or interlocking and torsion-proof connection between a connection element of a furniture drive and a rotating cross member of a furniture fitting.

FIG. 8 shows an alternative embodiment of a swivel lever 15, which is connected on its part in a torsion-proof manner to a rotating cross member 6. In the illustrated embodiment, the swivel lever 15 can be an injection-moulded plastic part which provides a trough-shaped receptacle for the rotating cross member 6. After the insertion of the rotating cross member 6 into the trough-shaped receptacle, the rotating cross member 6 is secured by screws 47 which extend transversely at the upper end of the trough, and the rotating cross member 5 is additionally tightly clamped in the trough.

Notice must be taken further that the furniture drive and at least the connection elements are arranged according to the embodiments in accordance with FIGS. 1 to 6 in an inventive manner for use in a furniture fitting 1, wherein the furniture fitting 1 need not be prepared or modified in any way for this purpose. The furniture drive can thus be inserted into the piece of furniture shortly before terminating the production process of the piece of furniture or upon delivery of the furniture to the consumer. The furniture drive can also advantageously be inserted a short while after delivery into the furniture fitting 1 when the consumer subsequently decides to implement motorisation of the piece of furniture. For this purpose, the connection elements are arranged in accordance with the invention for simple connection of the furniture drive to the cross member 5 and the rotating cross member 6, while simultaneously providing a stabilisation of the same in that the distance $d_A$ and $d_B$ is at least 25% of the width of the chair or the distance of the lever mechanisms 3.

Furthermore, a number of spaced force application points A, B or spaced force application regions A, B are provided by a number of connection elements which extend in a direction transversely to the relative movement between the drive unit 10 and the power take-off unit 30 along the cross member 5 or along the rotating cross member 6. The distance of the force application points or force application regions A or B is formed by the measure $d_A$ and $d_B$. The measure $d_A$ and $d_B$ is more than 25% of the travel of the furniture drive in one embodiment. In a further embodiment, the measure $d_A$ and $d_B$ is more than 25% of the distance of the lever mechanisms 3.

What is claimed is:

1. An electromotive furniture drive, comprising:
a drive unit;
a power take-off unit movable in relation to the drive unit; and
connection elements respectively arranged on the drive unit and on the power take-off unit for connecting the drive unit and the power take-off unit to a furniture fitting, wherein the connection elements are configured for providing at least two spaced-apart force application points for connection with the furniture fitting in a direction transversely to a relative movement between the drive unit and the power take-off unit, said force application points being spaced apart from one another,
wherein the electromotive furniture drive is operably connected to the furniture fitting for moving a furniture part, said electromotive furniture drive being configured, so that a force for a movement of the furniture fitting is not applied centrally to components of the furniture fitting, but it is distributed broadly over the furniture fitting and as a result the furniture fitting does not need to be modified for use with the furniture drive and a reinforcement of the components of the furniture drive fitting on which the furniture drive acts is not needed, and
wherein the connection elements are configured for a releasable connection.

2. The electromotive furniture drive of claim 1, wherein each of the connection elements is configured for providing at least two spaced-apart force application points for connection with the furniture fitting in a direction transversely to a relative movement between the drive unit and the power take-off unit, said force application points being spaced apart from one another at least by a distance which is greater than approximately 50% of a travel of the furniture drive.

3. The electromotive furniture drive of claim 1, constructed for attachment to the furniture fitting of a seating furniture.

4. The electromotive furniture drive of claim 1, wherein the distance of the force application points is greater than 25% of a width of the furniture fitting.

5. The electromotive furniture drive of claim 1, wherein the distance of the force application points is greater than 10 cm.

6. The electromotive furniture drive of claim 1, wherein the connection elements connect the drive unit and the power take-off unit to the furniture fitting in a frictionally engaged or interlocking manner.

7. The electromotive furniture drive of claim 1, wherein the connection elements are configured for connection with a cross member and/or rotating cross member extending transversely in the furniture fitting between lateral lever mechanisms.

8. The electromotive furniture drive of claim 7, wherein the power take-off unit has a cross-strut to form the connection element on the power take-off unit, said cross-strut being provided with spaced-apart half-shell-shaped clamps or clips and/or cable ties for connection with the cross member of the furniture fitting.

9. The electromotive furniture drive of claim 7, wherein the connection elements are configured as two spaced-apart swivel levers for connection with the cross member of the furniture fitting.

10. The electromotive furniture drive of claim 9, wherein the swivel levers are connectable in a torsion-proof manner to the rotating cross member of the furniture fitting.

11. The electromotive furniture drive of claim 9, wherein the swivel levers are arranged via swivel joints on extension arms of the drive unit.

12. The electromotive furniture drive of claim 9, wherein the swivel levers are arranged via swivel joints on a cross-strut of the power take-off unit.

13. The electromotive furniture drive of claim 1, wherein the drive unit comprises a motor which acts via a worm on a rotatably mounted spindle nut.

14. The electromotive furniture drive of claim 13, wherein the power take-off unit has a housing and at least one bearing for rotatably mounting the spindle nut in the housing of the power take-off unit.

15. The electromotive furniture drive of claim 14, wherein the power take-off unit comprises a torsion-proof spindle extending through the housing and operatively connected to the spindle nut.

16. The electromotive furniture drive of claim 15, further comprising a cover configured to cover the spindle on at least two sides.

17. The electromotive furniture drive of claim 16, wherein the cover surrounds the spindle at least on three sides in a U-shaped manner and is formed in one piece with integrated film hinges.

18. An electromotive furniture drive, comprising:
a drive unit;
a power take-off unit movable in relation to the drive unit; and
connection elements respectively arranged on the drive unit and on the power take-off unit for connecting the drive unit and the power take-off unit to a furniture fitting,
wherein each of the connection elements is configured for providing at least two spaced-apart force application points for connection with the furniture fitting in a direction transversely to a relative movement between the drive unit and the power take-off, said force application points being spaced from one another,
wherein the connection elements are configured for connection with a cross member and a rotating cross member extending transversely in the furniture fitting between lateral lever mechanisms, and
wherein the furniture drive acts on the cross member on one hand and on the rotating cross member on the other hand without being fixed in a stationary manner with one of its components to or on a base frame of the furniture fitting.

19. The electromotive furniture drive of claim 18, wherein the force application points are spaced apart from one another at least by a distance which is greater than approximately 50% of a travel of the furniture drive.

20. The electromotive furniture drive of claim 18, constructed for attachment to the furniture fitting of a seating furniture.

21. The electromotive furniture drive of claim 18, wherein the distance of the force application points is greater than 25% of a width of the furniture fitting.

22. The electromotive furniture drive of claim 18, wherein the distance of the force application points is greater than 10 cm.

23. The electromotive furniture drive of claim 18, wherein the connection elements connect the drive unit and the power take-off unit to the furniture fitting in a frictionally engaged or interlocking manner.

24. The electromotive furniture drive of claim 18, wherein the connection elements are configured for a releasable screwless connection.

25. The electromotive furniture drive of claim 18, wherein the connection elements are configured for connection with a cross member and/or rotating cross member extending transversely in the furniture fitting between lateral lever mechanisms.

26. The electromotive furniture drive of claim 25, wherein the power take-off unit has a cross-strut to form the connection element on the power take-off unit, said cross-strut being provided with spaced-apart half-shell-shaped clamps or clips and/or cable ties for connection with the cross member of the furniture fitting.

27. The electromotive furniture drive of claim 25, wherein the connection elements are configured as two spaced-apart swivel levers for connection with the cross member of the furniture fitting.

28. The electromotive furniture drive of claim 27, wherein the swivel levers are connectable in a torsion-proof manner to the rotating cross member of the furniture fitting.

29. The electromotive furniture drive of claim 27, wherein the swivel levers are arranged via swivel joints on extension arms of the drive unit.

30. The electromotive furniture drive of claim 27, wherein the swivel levers are arranged via swivel joints on a cross-strut of the power take-off unit.

31. The electromotive furniture drive of claim 18, wherein the drive unit comprises a motor which acts via a worm on a rotatably mounted spindle nut.

32. The electromotive furniture drive of claim 31, wherein the power take-off unit has a housing and at least one bearing for rotatably mounting the spindle nut in the housing of the power take-off unit.

33. The electromotive furniture drive of claim 32, wherein the power take-off unit comprises a torsion-proof spindle extending through the housing and operatively connected to the spindle nut.

34. The electromotive furniture drive of claim 33, further comprising a cover configured to cover the spindle on at least two sides.

35. The electromotive furniture drive of claim 34, wherein the cover surrounds the spindle at least on three sides in a U-shaped manner and is formed in one piece with integrated film hinges.

36. A piece of seating furniture, comprising:
a furniture fitting;
a furniture part fixed to the furniture fitting; and
an electromotive furniture drive operably connected to the furniture fitting for moving the furniture part, said electromotive furniture drive including a drive unit, a power take-off unit movable in relation to the drive unit, and connection elements respectively arranged on the drive unit and on the power take-off unit for connecting the drive unit and the power take-off unit to the furniture fitting, each of the connection elements providing at least two spaced-apart force application points for connection with the furniture fitting in a direction transversely to a relative movement between the drive unit and the power take-off unit, wherein the connection elements are connected with a cross-member and a rotating cross member extending transversely in the furniture fitting between lateral lever mechanisms of the furniture fitting, and wherein the furniture drive is only carried via the cross member and the rotating cross member.

37. The piece of seating furniture of claim 36, wherein said force application points are spaced apart from one another at least by a distance which is greater than approximately 50% of a travel of the furniture.

38. The piece of seating furniture of claim 36, constructed in the form of a seating furniture or a relaxation chair.

39. The seating piece of seating furniture of claim 36, wherein the distance of the force application points is greater than 25% of the seating furniture fitting.

40. The piece of seating furniture of claim 36, wherein the distance of the force application points is greater than 10 cm.

41. The piece of seating furniture of claim 36, wherein the connection elements connect the drive unit and the power take-off unit to the furniture fitting in a frictionally engaged or interlocking manner.

42. The piece of seating furniture of claim 36, wherein the connection elements are configured for a releasable connection.

43. The piece of seating furniture of claim 36, wherein the connection elements are configured for connection with a cross member and/or rotating cross member extending transversely in the furniture fitting between lateral lever mechanisms.

44. The piece of seating furniture of claim 43, wherein the power take-off unit has a cross-strut to form the connection element on the power take-off unit, said cross-strut being provided with spaced-apart half-shell-shaped clamps or clips and/or cable ties for connection with the cross member of the furniture fitting.

45. The piece of seating furniture of claim 43, wherein the connection elements are configured as two spaced-apart swivel levers for connection with the cross member of the furniture fitting.

46. The piece of seating furniture of claim 45, wherein the swivel levers are connectable in a torsion-proof manner to the rotating cross member of the furniture fitting.

47. The piece of seating furniture of claim 45, wherein the swivel levers are arranged via swivel joints on extension arms of the drive unit.

48. The piece of seating furniture of claim 45, wherein the swivel levers are arranged via swivel joints on a cross-strut of the power take-off unit.

49. The piece of seating furniture of claim 36, wherein the drive unit comprises a motor which acts via a worm on a rotatably mounted spindle nut.

50. The piece of seating furniture of claim 49, wherein the power take-off unit has a housing and at least one bearing for rotatably mounting the spindle nut in the housing of the power take-off unit.

51. The piece of seating furniture of claim 50, wherein the power take-off unit comprises a torsion-proof spindle extending through the housing and operatively connected to the spindle nut.

52. The piece of seating furniture of claim 51, wherein the electromotive furniture drive includes a cover configured to cover the spindle on at least two sides.

53. The piece of seating furniture of claim 51, wherein the cover surrounds the spindle at least on three sides in a U-shaped manner and is formed in one piece with integrated film hinges.

* * * * *